April 6, 1943. W. J. RYAN ET AL 2,315,738
TREATMENT OF CRACKED HYDROCARBON DISTILLATES
Filed May 13, 1939
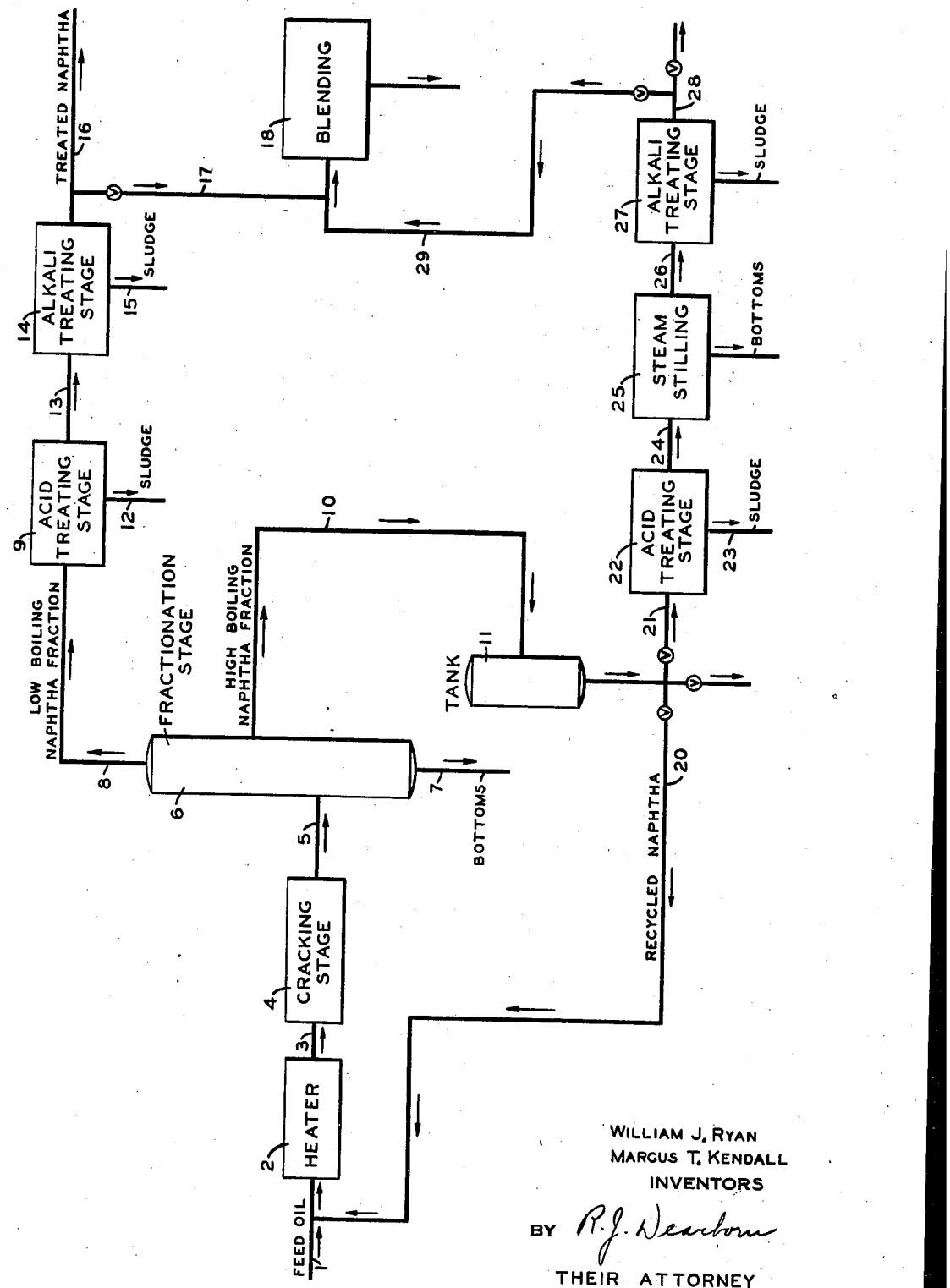
WILLIAM J. RYAN
MARCUS T. KENDALL
INVENTORS
BY R. J. Dearborn
THEIR ATTORNEY Patented Apr. 6, 1943

2,315,738

UNITED STATES PATENT OFFICE 2,315,738

TREATMENT OF CRACKED HYDROCARBON DISTILLATES

William J. Ryan, Wilmington, and Marcus T. Kendall, Long Beach, Calif., assignors, by mesne assignments, to The Texas Company, New York, N. Y., a corporation of Delaware Application May 13, 1939, Serial No. 273,566

2 Claims. (Cl. 196—32)

This invention relates to the chemical treatment of hydrocarbon oils and has to do particularly with the acid treatment and sweetening of cracked hydrocarbon distillates.

The present application is a continuation-in-part of pending application Serial No. 263,944, filed March 24, 1939, (now matured into U. S. Patent No. 2,249,276) which in turn is a continuation of pending application Serial No. 148,260, filed June 15, 1937.

In our earlier applications we have described a method of treating cracked hydrocarbon distillates with sulphuric acid of about 55 to 60% concentration, followed by treatment with strong caustic alkali solution at a temperature of about 150 to 300° F.

The present invention has to do with a modification of the foregoing method of treatment. It contemplates subjecting the cracked hydrocarbon distillate or distillates to fractionation into light and heavy fractions. These fractions are then subjected to separate chemical treatment under conditions of temperature and concentration adapted to produce a final product of desired characteristics.

In the treatment of cracked hydrocarbon distillates it is customary to employ sulphuric acid of about 66° Baumé gravity and having an acid concentration of about 93% $H_2SO_4$. The acid treated product, after removal of the sludge, is neutralized, rerun to remove high-boiling point polymerized bodies and then the neutralized product must be treated with doctor solution (sodium plumbite) in order to sweeten it.

The foregoing type of treatment is objectionable since the concentrated acid is relatively non-selective and causes considerable loss of valuable products.

It has the disadvantage of producing higher-boiling polymerization products which impair the quality of the oil. High-boiling sulphur-containing compounds may also be produced which impair the quality of the oil so that it is obligatory to use the expensive doctor treatment in order to convert the sour high-boiling mercaptans into sweet disulphides.

As disclosed in the aforesaid pending applications, the above objections may be overcome and the objects of our invention obtained by using certain treating reagents of specified strength and operating in a particular manner.

One advantage of the method of our invention is to selectively remove gum-forming constituents without substantially affecting the other constituents of the oil, such as those which form high-boiling polymerization products in the presence of concentrated sulphuric acid.

A further advantage of the invention, therefore, is to treat the oil to produce a product of the desired characteristics and containing substantially no high-boiling polymerized products which normally require redistillation of the treated oil in order to effect their separation and removal.

Another advantage of the invention is to carry out the acid-treating operation in such a manner that a product is obtained which may be readily sweetened without resort to the conventional doctor treatment.

Still another advantage of the invention is to provide means of sweetening in combination with the acid-treating operation whereby a finished product is produced much more economically and of improved quality.

In accordance with the method of the present invention a cracked product, such as a cracked naphtha distillate from a cracking still, or a mixture of cracked products from several stills or other sources of supply, is subjected to fractional distillation so as to separate it into a low-boiling fraction and a high-boiling fraction. The fractional separation is regulated so as to form a light fraction susceptible to treatment with weak acid without effecting substantial polymerization of non-gum-forming materials. This light fraction may, for example, comprise the major portion or more of the original mixture.

This light fraction is then treated with sulphuric acid of about 55 to 60% concentration to remove the gum-forming constituents. After removal of the acid sludge the treated fraction is subjected to the action of strong caustic alkali, preferably at elevated temperature, for the purpose of removing sulphur compounds.

If desired, this alkali treatment may precede the acid treatment.

The heavy or high-boiling fraction, which is substantially non-susceptible to the formation of high-boiling polymerization products during treatment with concentrated acid, is separately treated with concentrated sulphuric acid of about 98% $H_2SO_4$, or in excess of about 80% $H_2SO_4$, at a temperature between $+75°$ F. and $+60°$ F. This acid-treated heavy fraction is then steam-stilled and sweetened.

The acid-treated oil can be sweetened either with sodium plumbite solution or with hot caustic soda solution under pressure, as will be described later. It is desirable to steam-still this acid-treated heavy fraction prior to the sweetening step.

The neutralized fractions may then be combined to produce a finished gasoline of low sulphur content and low gum content.

According to a further modification of the invention, instead of subjecting the heavy naphtha fraction to treatment with concentrated acid, it may be subjected to cracking or reforming. The cracking may be accomplished by blending the heavy naphtha fraction with the charge oil to the cracking stills from which it was produced. In this latter case, the composite cracked naphtha product is then subjected to fractionation into light and heavy fractions, with recycling of the heavy fraction to the cracking stills, the light fraction being chemically treated as already described.

On the other hand, the heavy fraction of the naphtha may be subjected to a separate cracking or reforming action, whereby the hydrocarbon constituents are made more amenable and susceptible to treatment with weak acid in the manner already described. Thus, the naphtha may be subjected to elevated temperatures of around 750 to 1100° F. while under pressures ranging from about 50 to 600 pounds.

The reformed heavy fraction, after fractionation to remove undesirable high-boiling constituents, is treated with acid of around 55 to 60% concentration at about 70° F. so as to remove the gum-forming constituents without affecting other constituents. The acid sludge is removed and the acid-treated oil subjected to the action of strong alkali solutions at a temperature in the range of 150 to 350° F. and while under a substantial superatmospheric pressure. This treatment appears to remove the higher-boiling point sulphur bodies and any gum-forming hydrocarbons that remain, and thereby produces a naphtha which is sweet to the doctor test, low in sulphur content and substantially free from both potential and inherent gum.

The reformed and refractionated heavy fraction may be blended with the aforementioned light fraction and both fractions then treated together with the aforementioned weak acid of about 55 to 60% concentration, followed by strong caustic sweetening under heat and pressure.

In the acid treatment of the light fraction, or the reformed heavy fraction, it is preferable to employ acid having a concentration of around 55 to 60% $H_2SO_4$ at ordinary temperatures. Somewhat stronger acid, for example, up to 80% concentration, may be used by further reducing the temperature to say, −75°. The stronger the acid, the lower the temperature which must be used in order to avoid affecting adversely other constituents of the oil. Likewise, if temperatures of above normal room temperature, for example, up to 100° F., are employed, the acid concentration should not exceed about 50% $H_2SO_4$.

It has been found that sulphuric acid treatment of cracked distillates with acid having a concentration of over 60% at ordinary temperatures (60° F. to 75° F.) starts polymerization and, even though slight, it increases the gum content and necessitates rerunning to remove this gum of polymerization.

Treatment with acid of less than 55% $H_2SO_4$, at about ordinary temperature, fails to remove a substantial portion of the inherent gum (naturally present in the raw gasoline) and thus the gasoline is unfit for commercial use.

On the other hand, it has been definitely ascertained that sulphuric acid of a strength between 55% and 60% $H_2SO_4$ has a particularly selective action on cracked distillates at ordinary temperatures—that is, around normal room temperature. Such treatment removes substantially all the unstable gum-forming constituents and at the same time avoids the polymerization of relatively stable or non-gum-forming constituents. For example, if the gum formation is due to diolefins, it is desirable to selectively remove these compounds without substantial polymerization of other olefin compounds. It has been found that a gum stable product may be obtained without measurable effect on other properties, such as anti-knock, color, etc.

The particular manner of applying the acid may be varied considerably. Good results have been obtained by adding the acid portion-wise. We prefer to use from 2 to 5 dumps of acid, although in some cases it may be satisfactory to use only one dump. A total of about 2 to 12 pounds of acid per barrel of oil is ordinarily sufficient. Any well-known or preferred method of contact may be used, such as orifice plates or mechanical mixers, although we prefer a counterflow type of operation. Ordinary temperatures may be used, although it is contemplated that low temperature acid treatment may be employed.

The acid-treated product, after separation of the acid sludge, is neutralized in the customary manner with aqueous caustic alkali or caustic soda. A caustic soda solution of about 5 degrees Baumé gravity is ordinarily used. In some cases this preliminary neutralizing step may be omitted and the acid-treated product subjected directly to the hot alkali treatment described hereafter.

The acid-treated product above described should be substantially free from high-boiling polymerized products and as a result the end point should not be materially altered, whereby redistillation would be required. The product is also essentially free from sulphur compounds which are refractory and difficult to treat. Accordingly, the product so previously treated is peculiarly adapted for the hot alkali treatment in place of the more expensive, customary doctor treatment with sodium plumbite.

The alkali treating or sweetening step is carried out by contacting the oil by any suitable means with a strong alkali solution such as caustic soda. The strength of alkali may be varied and one skilled in the art will be able to determine the required strength to obtain the desired results.

We have found solutions varying from 20 to 50 degrees Baumé gravity satisfactory, and prefer to use about 45 degrees gravity. The temperature of treatment should be at least about 150 degrees F. and may be as high as 300 degrees F. or more. We prefer temperatures around 200 to 210 degrees F.

The mixture is also maintained under a substantial superatmospheric pressure. This pressure may be that self-generated by confining the vapors of the mixture and should be at least about 50 pounds, although pressures of 150 or even up to 500 pounds or more are contemplated. We prefer about 60 to 100 pounds pressure.

It is essential for the success of the sweetening step of the invention that substantially no polymerization takes place in the acid-treating step. Without restricting the invention in any way to a particular theory of reaction, it is believed that when polymerization occurs, high-boiling point mercaptans are formed, which will not react with the caustic soda, even under the influence of heat and pressure, and as a result, normally would require the use of plumbite to convert them to disulphides. The present invention provides means for selectively dissolving the inherent gum and substantially preventing polymerization.

The invention is particularly advantageous for treating high sulphur-content oils, such as obtained from California petroleum. It is simple and efficient and eliminates the expensive doctor treating operation and substitutes a simple caustic treatment. The reagents, particularly the caustic solution, may be recovered and restored to substantially the original activity by releasing the pressure and steaming.

Instead of first acid-treating the oil and then subjecting the acid-treated product to the hot alkali treatment, it is sometimes advantageous to give the oil the hot alkali treatment prior to the acid-treatment. It is contemplated, therefore, that the untreated oil may be first subjected to treatment with strong alkali substantially as described, the alkali-treated product treated with the sulphuric acid and the acid-treated product neutralized with dilute caustic solution to produce a finished product. For example, a cracked naphtha was treated at a temperature of approximately 325 degrees F. and under a pressure of about 175 pounds with a caustic soda solution of approximately 25° Baumé gravity, whereby the sulphur compounds were substantially removed. The treated naphtha was then subjected to the above described weak acid treatment. The acid-treated product was then neutralized with a weaker caustic soda solution to produce a sweet, gum-stable product of low sulphur content.

While we have specified caustic soda solution, it is contemplated that other compounds of the alkali metals or of the alkali earth metals are within the scope of the invention.

The present invention has the advantage over the conventional method of treatment in that the cost of chemicals is materially decreased, treating losses are reduced and the anti-knock value of the finished product is increased. It has been found, for example, that treating costs may be reduced 50-75% by our invention; that treating losses may be as much as 60% lower and that the anti-knock value of the finished product may be several points higher than normally obtained.

In order to describe the invention further reference will now be made to the accompanying drawing comprising a flow diagram of the operations referred to above.

Feed oil to be cracked or converted into gasoline hydrocarbons is conducted from a source not shown through a pipe 1 to a heater 2 wherein the oil is heated to a temperature in the range 750 to 1100° F. The heated hydrocarbons are passed from the heater 2 through a pipe 3 to a cracking stage 4 wherein conversion into gasoline hydrocarbons occurs.

The cracked hydrocarbons are conducted from the cracking stage through a pipe 5 to a fractionating stage 6.

In the fractionating stage the naphtha components are separated from the heavier hydrocarbons, which latter are drawn off as bottoms through a pipe 7. The naphtha components are separated into low boiling and high boiling fractions respectively. The low boiling fraction is conducted through a pipe 8 to an acid treating stage 9, while the high boiling fraction is conducted through a pipe 10 to a receiver or tank 11.

The low boiling naphtha is subjected to contact in the stage 9 with sulfuric acid containing about 50 to 60% $H_2SO_4$ at a temperature of about 60 to 75° F. The resulting sludge is drawn off through a pipe 12 while the acid treated naphtha is conducted through a pipe 13 to an alkali treating stage 14 wherein it is subjected to treatment with concentrated caustic alkali solution. The alkali treatment is advantageously effected at a temperature in the range about 150 to 300° F. and under superatmospheric pressure.

The resulting sludge is discharged through a pipe 15 while the alkali treated naphtha is discharged through a pipe 16, which may communicate with a pipe 17 leading to a blending tank 18.

The high boiling naphtha fraction accumulating in the tank 11 is advantageously recycled all or in part through a pipe 20 communicating with the previously mentioned pipe 1.

That portion of the naphtha which is not recycled may be conducted through a branch pipe 21 to an acid treating stage 22 wherein it is treated with concentrated sulfuric acid.

The resulting sludge is discharged through a pipe 23, while the treated naphtha hydrocarbons are conducted through a pipe 24 to a steam stilling stage 25. The steam stilled naphtha is conducted through a pipe 26 to an alkali treating stage 27 wherein neutralization or sweetening is effected. The sweetened naphtha is discharged through a pipe 28 and may all or in part be conducted through a branch pipe 29 communicating with the previously mentioned tank 18 wherein the sweetened naphtha is blended with the previously mentioned light naphtha fraction.

Obviously many modifications and variations of the invention, as hereinbefore set forth, may be made without departing from the spirit and scope thereof and therefore only such limitations should be imposed as are indicated in the appended claims.

We claim:

1. In the manufacture of gasoline, the steps which comprise subjecting hydrocarbon oil having a high sulphur content to thermal conversion by exposure to elevated temperatures in the range at which higher boiling hydrocarbons undergo conversion into lower boiling hydrocarbons, forming cracked naphtha distillate of high sulphur content containing gum-forming constituents as well as non gum-forming polymerizable constituents, separating said distillate into a lower boiling fraction containing constituents susceptible to formation of high boiling polymerization products at ordinary temperature when in the presence of sulfuric acid having a concentration in excess of 60% $H_2SO_4$, and a higher boiling naphtha fraction substantially free from such constituents and containing gasoline hydrocarbons in substantial amount, subjecting the lower boiling fraction to the action of sulfuric acid of about 50 to 60% $H_2SO_4$, and at a temperature of about 60 to 75° F. whereby gum-forming constituents are removed without substantially affecting other constituents, removing the acid sludge, subjecting the acid treated oil to the action of concentrated caustic alkali solution at a temperature in the range of about 150 to 300° F. and while under a substantially superatmospheric pressure to remove sulphur-containing bodies, and recycling the higher boiling naphtha fraction to said thermal conversion for further exposure to elevated temperature in the presence of fresh charge oil and wherein it undergoes further conversion.

2. The method according to claim 1 in which the thermal conversion is effected at a temperature in the range 750 to 1100° F.

WILLIAM J. RYAN.
MARCUS T. KENDALL.

CERTIFICATE OF CORRECTION.

Patent No. 2,315,738.                                April 6, 1943.

WILLIAM J. RYAN, ET AL.

It is hereby certified that error appears in the printed specification of the above numbered patent requiring correction as follows: Page 1, second column, line 49, for "between $+75°$ F." read --between $-75°$ F.--; and that the said Letters Patent should be read with this correction therein that the same may conform to the record of the case in the Patent Office.

Signed and sealed this 25th day of May, A. D. 1943.

Henry Van Arsdale, (Seal)                         Acting Commissioner of Patents.